(12) United States Patent
Degrand

(10) Patent No.: US 6,538,068 B1
(45) Date of Patent: Mar. 25, 2003

(54) FILMS BASED ON ETHYLENE COPOLYMERS AND GLOVES MADE OF THESE FILMS

(75) Inventor: Michel Degrand, Bernay (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/717,311

(22) Filed: Nov. 22, 2000

(30) Foreign Application Priority Data

Nov. 25, 1999 (FR) .............................................. 99 14834

(51) Int. Cl.$^7$ .......................... C08L 23/00; C08L 23/04; C08L 33/04; C08L 35/02
(52) U.S. Cl. ....................... 525/191; 525/222; 525/240; 525/241
(58) Field of Search ................................ 525/191, 221, 525/222, 240

(56) References Cited

U.S. PATENT DOCUMENTS

| 3,639,521 A | 2/1972 | Hsieh et al. |
| 3,709,957 A | 1/1973 | Brebner |
| 4,547,413 A | 10/1985 | Lustig |
| 6,107,454 A | * 8/2000 | Schmieg et al. ............ 528/487 |

FOREIGN PATENT DOCUMENTS

| CA | 1 321 437 A | 8/1993 |
| EP | 0 244 982 A | 11/1987 |
| EP | 0 849 323 A | 6/1998 |
| WO | WO 94/20574 | 9/1994 |

OTHER PUBLICATIONS

Ullman's Encyclopedia of Industrial Chemistry, 5$^{th}$ Ed. (1995), vol. A26, pp. 655–659.

* cited by examiner

Primary Examiner—Nathan M. Nutter
(74) Attorney, Agent, or Firm—Smith, Gambrell & Russell, LLP

(57) ABSTRACT

The present invention relates to film consisting of a blend comprising (i) 70 to 98% by weight of a polymer (Z) chosen from (a) a poly-ethylene (C) obtained by metallocene catalysis, (b) a copolymer (A) of ethylene and of a monomer chosen from vinyl acetate, the vinyl acetate content being between 18 and 40% by weight and an alkyl (meth)acrylate and (c) a blend thereof, (ii) 2 to 30% by weight of high-density polyethylene. The present invention also relates to gloves made of the above films. These gloves are manufactured by thermal welding of the films.

8 Claims, 2 Drawing Sheets

FILMS BASED ON ETHYLENE COPOLYMERS AND GLOVES MADE OF THESE FILMS

FIELD OF THE INVENTION

The present invention relates to polyethylene-based films and to gloves made of these films.

BACKGROUND OF THE INVENTION

In surgery, in medicine, in the veterinary field, in hairdressing, for applying shampoos and dyes for example, in clean rooms in the electronics industry, and in many applications, disposable gloves are used. The gloves of the present invention are of this type.

Patent EP 643 743 describes gloves made of SBS (styrene-butadiene-styrene) or SIS (styrene-isoprene-styrene) block copolymers. An emulsion of these copolymers is prepared and then a glove-shaped mould is immersed therein. The combination is then left to dry and the glove is obtained.

Patent EP 244 982 describes films consisting (by weight) of 30 to 80% of an ethylene-methyl acrylate copolymer and of 70 to 20% by VLDPE (very low density polyethylene). The proportion of methyl acrylate in the copolymer is between 17 and 22% by weight, the relative density of the VLDPE is between 0.902 and 0.910 and the MFI (melt flow index) is between 0.1 and 10 g/10 min. Preferably, the proportions of the ethylene-methyl acrylate copolymer and of the VLDPE are 50 to 70 and 50 to 30% by weight, respectively. The gloves are produced by welding the film.

It is much simpler to make gloves by welding a film than by immersion of a mould and drying. The films described in EP 244 982 are tacky and must be filled with antiblocking agents and slick agents. In addition, their elongation at break is not high enough.

SUMMARY OF THE INVENTION

The object of the invention is to make films having a high puncture strength, that is to say it must be virtually impossible to puncture them with the fingers and the films must have an elongation at break of at least 100%. These conditions are in fact a minimum in order to prevent the gloves manufactured from these films from tearing when they are slipped onto one's hand.

Another object of the invention is to make films having a silky appearance.

Another object of the invention is to make films exhibiting good elasticity necessary from the point of view of comfort for the purpose of obtaining a much more precise fit on the hand and consequently to make movements more precise. The term "elasticity" is understood to mean within the context of the invention the possibility of stretching the film by 80% of its length at a temperature between 15 and 25° C. for 1 minute, the film returning to within at least 25% of its initial length after stretching. The permanent set is therefore at most 25%.

DETAILED DESCRIPTION OF THE PREFERRED EMBODIMENTS

Figure 1:
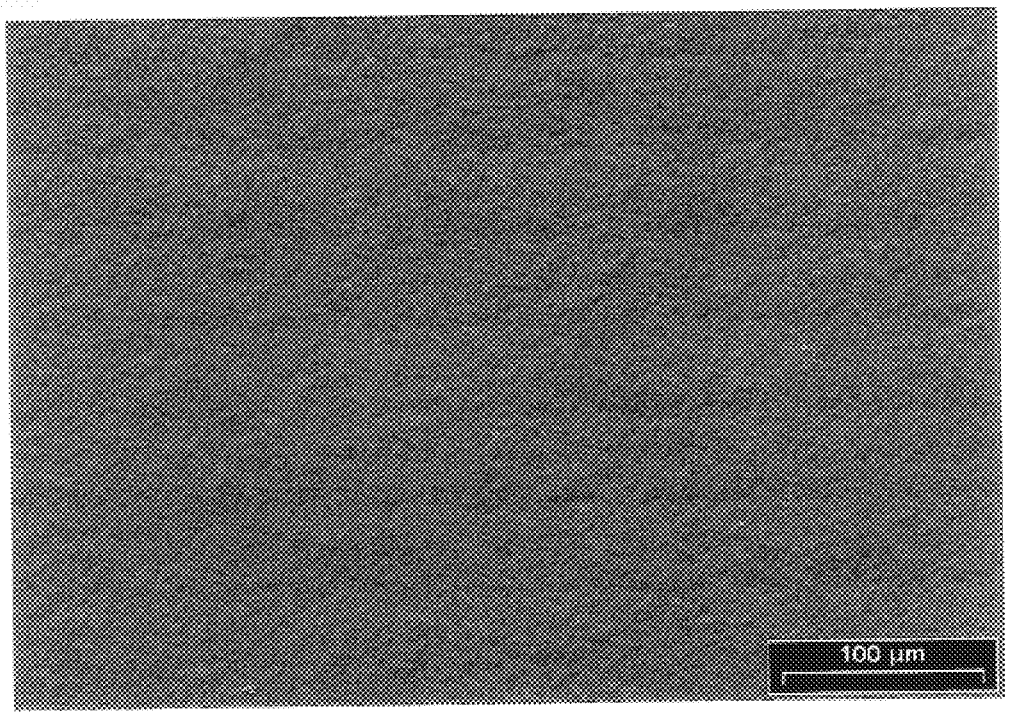
FIG. 1 is a photograph of the surface of the film produced by the present invention.

The present invention relates to film consisting of a blend comprising:

70 to 98% by weight of a polymer (Z) chosen from (a) a polyethylene (C) obtained by metallocene catalysis, (b) an ethylene copolymer (A) and (c) a blend thereof; and 2 to 30% by weight of high-density polyethylene (HDPE).

In the blend of polyethylene (C) and copolymer (A), the proportion of the polyethylene (C) is from 0 to 50% by weight and the proportion of the copolymer (A) is from 50 to 100% by weight.

The present invention also relates to gloves made from the above films. These gloves are manufactured by thermal welding of the films.

With regard to the term "metallocene polyethylene", it denotes polymers obtained by the copolymerization of ethylene and of alpha-olefins such as, for example, butene, hexene or octene, in the presence of a monosite catalyst generally consisting of an atom of a metal which may, for example, be zirconium or titanium and of two alkyl cyclic molecules linked to the metal. More specifically, metallocene catalysts are usually composed of two cyclopentadiene rings linked to the metal. These catalysts are frequently used with aluminoxanes as cocatalysts or activators, preferably methylaluminoxane (MAO). Hafnium may also be used as the metal to which the cyclopentadiene is attached. Other metallocenes may include transition metals of Groups IVA, VA and VIA. Metals from the lanthanide series may also be used.

These polymers are homogeneous in composition. Preferably, we use a metallocene polyethylene (ethylene/alpha olefins such as butene, hexene or octene) having a relative density <0.91

The molecular distribution of these metallocene polyethylenes is very narrow and is characterized by a low polydispersity index (a ratio $I=M_w/M_n$), generally $I<3$ and preferably $I<2$, in which $M_w$ and $M_n$ denote the weight-average molar mass and the number-average molar mass, respectively.

The copolymer (A) may be an ethylene-vinyl acetate copolymer or an ethylene-alkyl (meth)acrylate copolymer.

With regard to the ethylene-vinyl acetate copolymer, the proportion of vinyl acetate is advantageously between 5 and 40% by weight and preferably between 18 and 40% by weight.

The MFI (melt flow index) of these copolymers is advantageously between 0.3 and 50 g/10 min (at 190° C. under a load of 2.16 kg).

With regard to the ethylene-alkyl (meth)acrylate copolymer (A), the alkyls may have up to 24 carbon atoms. Examples of alkyl acrylates or methacrylates are, in particular, methyl methacrylate, ethyl acrylate, n-butyl acrylate, isobutyl acrylate and 2-ethylhexyl acrylate.

The MFI of these copolymers is advantageously between 0.3 and 50 g/10 min (at 190° C. under a load of 2.16 kg). Advantageously, the alkyl (meth)acrylate content is between 18 and 40% by weight of (Z) and preferably between 22 and 28%. These copolymers may be manufactured by radical polymerization in a tube or autoclave at pressures between 1000 and 2500 bar.

It would not be outside the scope of the invention if (A) were a blend of two or more of the above copolymers.

With regard to high-density polyethylene (HDPE), it is described in KIRK-OTHMER, 4th edition, Vol. 17, pages 704 and 724–5. According to ASTM D 1248-84, it is an ethylene polymer having a relative density of at least 0.940. The term HDPE relates both to ethylene homopolymers and to its copolymers with small proportions of an α-olefin. The relative density is advantageously between 0.941 and 0.965. In the present invention, the MFI of the HDPE is advantageously between 0.1 and 50 g/10 min (at 190° C. and under a load of 2.16 kg).

By way of example, mention may be made of ELTEX A 2008® of 0.961 relative density and 0.8 MFI (in g/10 min at 190° C. under a load of 2.16 kg) and STAMYLEX 7359® of 0.954 relative density and 35 MFI (in g/10 min at 190° C. under a load of 2.16 kg).

Advantageously, the proportion of HDPE is from 4 to 12 parts per 96 to 88 parts of polymer (Z).

According to a preferred embodiment of the invention, the blend comprises, in addition to (Z) and the HDPE, a styrene block copolymer (B). This copolymer (B) comprises polystyrene blocks and optionally hydrogenated polyisoprene or polybutadiene blocks.

Block copolymers (B) are described in ULLMANN's ENCYCLOPEDIA OF INDUSTRIAL CHEMISTRY, 5th edition (1995), Vol. A 26, p. 655–9. Advantageously, these are copolymers of formula E-D-E or of formula:

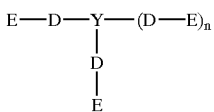

in which n equals 1, 2 or 3 and E and D represent blocks. The E blocks represent polymerized styrene and the D blocks polymerized butadiene, polymerized isoprene or a polymerized mixture of butadiene and isoprene. The D blocks may be hydrogenated (they are then, for example, SEBSs).

Y is a polyfunctional entity coming, for example, from polyfunctional coupling agents used in the manufacture of star block copolymers. Such agents, as well as these block copolymers, are described in U.S. Pat. No. 3,639,521.

Preferred star block copolymers contain 15 to 45% by weight and better still 25 to 35% by weight of styrene units. The molar mass is at least 140,000 and even better at least 160,000.

Particularly preferred star block polymers are those described in EP 451 920. These copolymers are based on styrene and isoprene, the molar mass of the polystyrene blocks is at least 12,000 and the polystyrene content is at most 35% by weight of the total mass of the block copolymer.

The preferred linear block copolymers have a molar mass between 70,000 and 145,000 and contain 12 to 35% polystyrene by weight. Particularly preferred linear block copolymers are those based on styrene and isoprene which are described in European Patent EP 451 919. These copolymers have polystyrene blocks of molar mass between 14,000 and 16,000 and a polystyrene content of between 25 and 35% by weight of the block copolymer. The molar mass is between 80,000 and 145,000 and even better between 100,000 and 145,000.

The proportion of the styrene block copolymer (B) may represent up to 40 parts per 100 parts of the (Z)/HDPE blend and preferably 5 to 40 parts.

The films of the invention have a permanent set of at most 25% of the initial length. This permanent set is measured by pulling a strip (15 mm in width with an initial length $l_0$=100 mm) at a rate of 500 mm/min to elongations of up to 80% followed by unloading down to zero force. This test is carried out at room temperature. The forces in N on loading (l) and on unloading (u) at 20%, 40%, 60% and 80%, then the permanent set, are noted. Advantageously, this permanent set is between 15 and 22%.

Another feature of the films of the invention is the tensile force on loading (l), measured under the conditions mentioned above with regard to the permanent set measurement, to an elongation of 60% of a film 30 pim in thickness. This force is less than or equal to 5 N and advantageously is between 2 and 5 N.

The blend of the invention may also include slip agents, antiblocking agents, antioxidants, UV stabilizers and fillers.

As examples of slip agents, mention may be made of N,N'-ethylene-bisamides of formula:

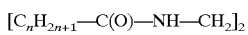

in which n is an integer ranging from 17 to 21.

As illustrations of N,N'-ethylenebisamides that can be used according to the present invention, mention may be made of N,N'-ethylenebisstearamide, N,N'-ethylenebisoleamide, N,N'-ethylenebisgadoleamide, N,N'-ethylenebiscetoleamide, N,N'-ethylenebiserucamide and a mixture of at least two of the aforementioned N,N'-ethylenebisamides.

As examples of slip agents, mention may also be made of metal salts of fatty acids, such as zinc stearate.

As examples of antiblocking agents, mention may be made of fatty acid primary amides, silica, talc and a mixture of at least two of the aforementioned compounds. As illustrations of saturated fatty acid primary amides, mention may be made of erucamide, oleamide, stearamide, palmitamide and a mixture of at least two of the aforementioned compounds.

As examples of antioxidants, mention may be made of sterically hindered phenols, mercaptans and phosphites.

As examples of UV absorbers, mention may be made of substituted benzophenones, substituted phenylbenzotriazoles and sterically hindered amines.

The total amount of slip agents, antiblocking agents, antioxidants and UV stabilizers may represent up to 10 parts per 100 parts of the blend of (Z) and the HDPE.

The blends of the polymer (Z), the HDPE and optionally the styrene block copolymer (B) are prepared by the usual techniques for thermoplastic polymers in single-screw or twin-screw extruders, mixers or machines of the BUSs® Ko-kneader type.

The polymer (Z), the HDPE and the optional copolymer (B) may be introduced separately into the mixer device.

The HDPE may be added in the form of a masterbatch in the polymer (Z). The additives, such as the slip agents, the antiblocking agents, the antioxidants, the UV stabilizers and the fillers, may be added to these machines, either as they are, or in the form of a masterbatch in the polymer (Z) or in the form of a masterbatch with the HDPE. The blends obtained may either by fed directly into the machines for manufacturing the film or they may be recovered in the form of granules which can subsequently be remelted and introduced into the machines for manufacturing the film.

Various methods can be used to manufacture the films. Advantageously, the lay-flat or bubble-blowing process and the cast process are used. These processes are known per se. The thickness of the films may vary from 5 to 250 μm and preferably between 8 and 50 μm.

It was observed that the films of the invention had a grainy appearance resembling an embossment, although no embossing operation was carried out during their manufacture. This appearance may be seen in the photographs of the films in FIGS. 1 to 3.

With regard to the gloves, these are obtained by welding the films into a suitable shape and then separating the gloves by ripping the welded films. The advantage of the gloves of the invention is to have an elastic behaviour, an excellent tactile sensitivity together with good mechanical properties. Another advantage of the gloves of the invention is to allow good mechanical integrity of the welds using narrow weld beads, that is to say having a width of between 0.05 and 1 mm.

EXAMPLES

The following products were used:

24MG005: an ethylene-methyl acrylate copolymer having an acrylate content of 24% by weight, a 0.5 MFI (in g/10 min at 190° C. under a load of 2.16 kg) and containing 0.25% by weight of ethylenebisoleamide and 0.15% by weight of erucamide.

MM X1331: a masterbatch consisting of 78.7% by weight of HDPE, 19.8% by weight of 10MOOS® talc and 1.5% by weight of erucamide; the HDPE and the ELTEX A 2008® of 0.961 relative density and 0.8 MFI (in g/10 min at 190 C. under a load of 2.16 kg).

14MG02: a blend of (i) 89.8% of an ethylene-methyl acrylate copolymer having an acrylate content of 14% by weight and an MFI of 2 (in g/10 min at 190 C. under a load of 2.16 kg), of (ii) 0.2% by weight of erucamide, of (iii) 2% by weight of 10MOOS talc and of (iv) 8% by weight of HDPE ELTEX A2008.

Films were manufactured and the following properties measured:

Measurement of the tensile properties: (ISO 527/3:95 standard) Strips 15 mm in width, cut in the machine direction and in the transverse direction, with $l_0$ (initial length) of 50 mm Pull rate of 1 mm/min for measuring the modulus (linear regression between 0.05% and 0.25%) then a pull rate of 500 mm/min up to break;

Tear measurement: (NFT 54-141:84 and ISO 6383/2 standards) Elmendorf method:constant-radius test piece;

Dart test measurement: (NFT 54-109:73 standard) Method A: 66 cm drop height;

Elasticity Test

Internal method for measuring the hysteresis loop of the films: A strip (15 mm in width with $l_0$=100 mm) is pulled at a rate of 500 mm/min to elongations up to 80% and then unloaded down to zero force. The forces in N on loading (l) and on unloading (u) at 20%, 40%, 60% and 80%, then the permanent set, are noted;

Tensile Test on the Weld of the Gloves

Two gloves were produced with JOISTEN machine with the 30 plm thick films consisting of 24MG005 and the MMX1 331 masterbatch in proportions of 90/10 in the case of the 1 st glove and 95/5 in the case of the second glove. The weld was pulled at 100 mm/min to failure and then a strip of the glove without a weld was pulled to failure. The ratio of the two forces obtained is taken as a measure of the quality of the weld (NFT 54-122:76).

Figure 2:
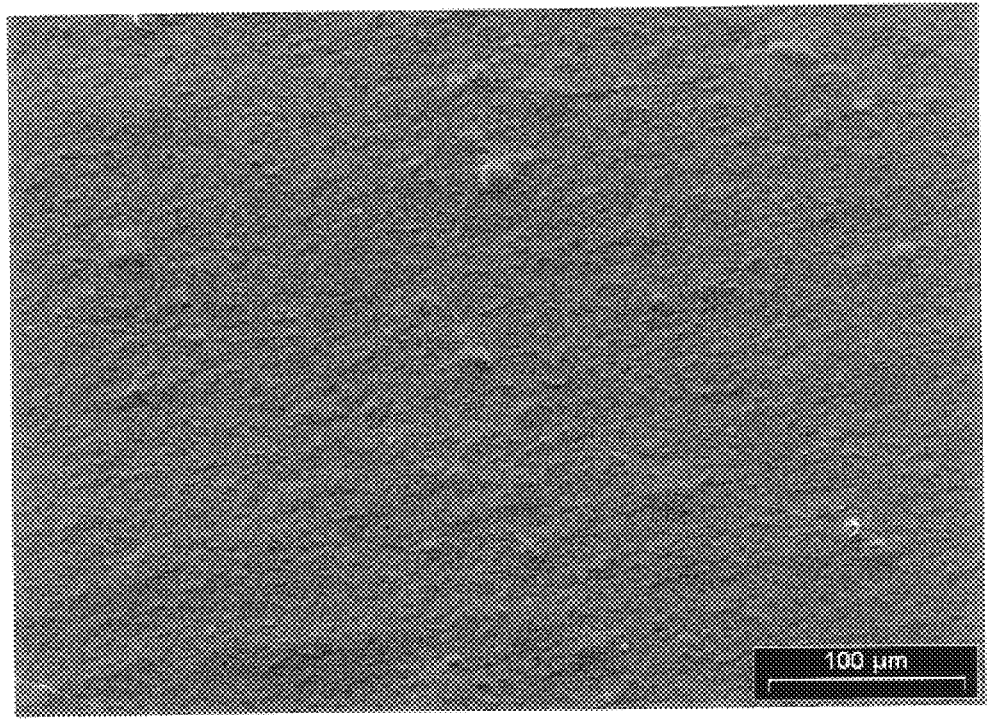
FIG. 2 is a photograph of the surface of another film produced by the present invention.
Figure 3:
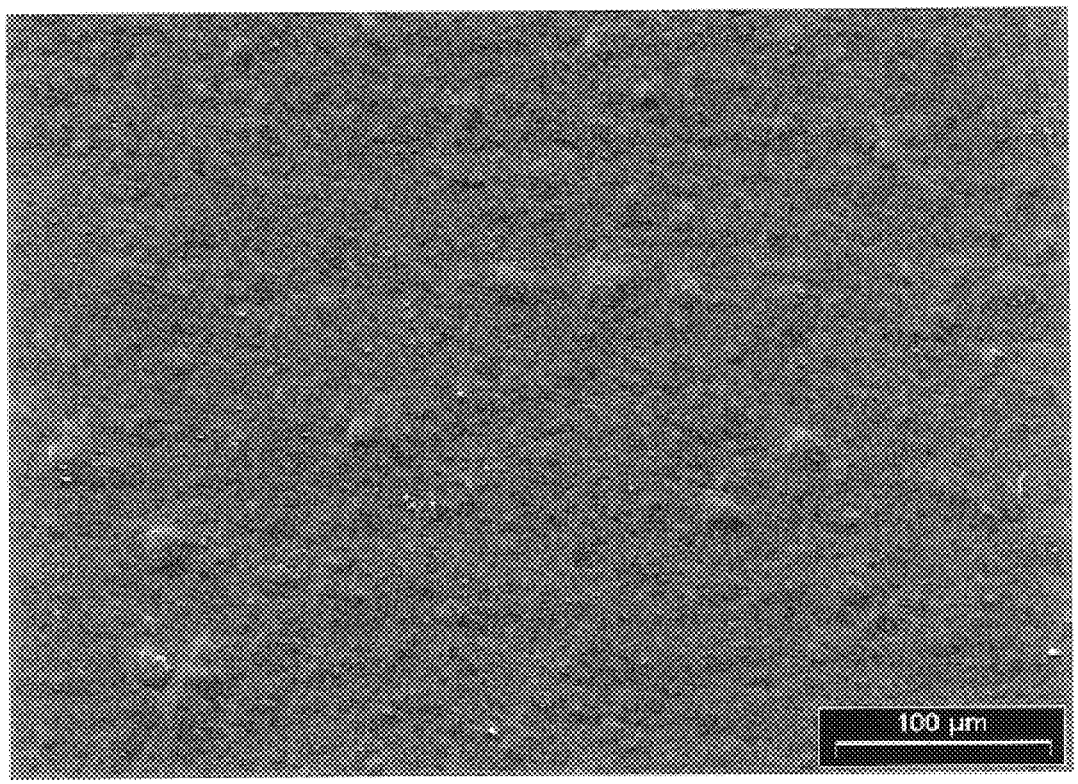
FIG. 3 is a photograph of the surface of yet another film produced by the present invention.

FIGS. 1, 2 and 3 show the photos of the 24MG005-based films containing 0, 5 and 10% by weight of the MM X1331 masterbatch, respectively. As may be seen in these photos, adding the MM X1331 creates, on the surface of the film, microroughness which improves the tactile aspect of the film and gives it this silky appearance.

The results are given in Tables 1, 2 and 3 below.

TABLE 1

| | Glove weld tensile test | | |
|---|---|---|---|
| Composition of the film | Weld strength in N | Film strength in N | Weld quality |
| 24MG005+ MM X1331 90/10 | 6.6 0.5 | 10.7 0.6 | 62% |
| 24MG005+ MM X1331 95/5 | 7.4 0.1 | 8.2 0.5 | 90% |

TABLE 2

| | | | ISO 527 tensile test | | | | |
|---|---|---|---|---|---|---|---|
| Film composition | Film thickness in μm | Direction measured | Tensile strength (MPa) | Elongation at break (%) | Modulus (MPa) | Tear strength in cN | Dart test, method A (mass in g) |
| 24MG005 | 30 | MD | 23.8 | 377.1 | 38.1 | 14 | — |
| | | σ | 2.5 | 49.6 | 5.9 | 2 | |
| | | TD | 22.2 | 814.8 | 24.9 | 118 | |
| | | σ | 1.9 | 45.9 | 4.6 | 13 | |
| 24MG005 + MM x 1331 90/10 | 30 | MD | 24.5 | 460.9 | 39.7 | 41 | — |
| | | σ | 1.3 | 29.7 | 4.5 | 3 | |
| | | TD | 31.4 | 829 | 46.6 | 172 | |
| | | σ | 1.5 | 18.7 | 6.9 | 11 | |
| 24MG005 + MM x 1331 95/5 | 30 | MD | 26.5 | 507.7 | 33.8 | 25 | — |
| | | σ | 1.1 | 13.7 | 0.5 | 2 | |
| | | TD | 24.9 | 833.5 | 27.6 | 154 | |
| | | σ | 0.3 | 7.2 | 1.6 | 15 | |
| 14MG02 | 25 | MD | 23.5 | 479.8 | 49.6 | 58 | 266 |
| | | σ | 2.6 | 63.1 | 7.6 | 9 | |
| | | TD | 20.7 | 764.9 | 41.6 | 145 | |
| | | σ | 1.1 | 42.3 | 7.2 | 3 | |

MD = machine direction
TD = transverse direction
It was not possible to carry out the Dart test measurements on the films at 24% since deformation is too great upon impact.

TABLE 3

| Film composition | Film thickness in μm | Elasticity test | | | | | | | |
|---|---|---|---|---|---|---|---|---|---|
| | | F at 20% on l (in N) | F at 20% on u (in N) | F at 40% on l (in N) | F at 40% on u (in N) | F at 60% on l (in N) | F at 60% on u (in N) | F at 80% on l (in N) | Permanent set (%) |
| 24MG005 | 30 | 2.48 | 0.09 | 3.59 | 0.51 | 4.18 | 1.08 | 4.55 | 15.4 |
| | | *0.07* | *0.02* | *0.07* | *0.01* | *0.09* | *0.02* | *0.11* | *0.7* |
| 24MG005 + MM × 1331 95/5 | 30 | 2.53 | 0.03 | 3.50 | 0.51 | 4.03 | 1.14 | 4.38 | 17.6 |
| | | *0.08* | *0.01* | *0.09* | *0.03* | *0.10* | *0.05* | *0.11* | *0.9* |
| 24MG005 + MM × 1331 90/10 | 30 | 3.00 | 0.00 | 3.99 | 0.49 | 4.54 | 1.28 | 4.90 | 21.1 |
| | | *0.33* | | *0.38* | *0.05* | *0.41* | *0.10* | *0.44* | *2.4* |
| 14MG02 | 25 | 2.65 | 0.00 | 3.32 | 0.29 | 3.83 | 1.09 | 4.17 | 30.0 |
| | | *0.07* | | *0.07* | *0.01* | *0.07* | *0.03* | *0.06* | *1.5* |

The values in italics represent the standard deviations
F: force; l: loading; u: unloading

What is claimed is:

1. Film of a blend comprising:

70 to 98% by weight of a polymer (Z) selected from (a) a polyethylene (C) obtained by metallocene catalysis, (b) a copolymer (A) of ethylene and of a monomer chosen from vinyl acetate, the vinyl acetate content being between 18 and 40% by weight, and an alkyl (meth)acrylate, and (c) a blend of the said polyethylene (C) and the said copolymer (A); and 30 to 2% by weight of high-density polyethylene (HDPE);

wherein the film has a permanent set of at most 25%, the measurement being made at room temperature on a strip having a width of 15 mm and an initial length $l_0$ of 100 mm by pulling at a rate of 500 mm/min to elongations up to 80% followed by unloading down to zero force.

2. Film according to claim 1, wherein in said blend of polyethylene (C) and copolymer (A), the proportion of the polyethylene (C) is from 0 to 50% by weight and the proportion of the copolymer (A) is from 50 to 100% by weight.

3. Film according to claim 1, wherein the alkyl (meth) acrylate content is between 18 and 40% by weight.

4. Film according to one of claim 1, wherein the proportion of HDPE is from 4 to 12 parts per 96 to 88 parts of polymer (Z).

5. Film according to any one of claim 1, wherein the blend comprises, in addition to the polymer (Z) and the HDPE, a styrene block copolymer (B).

6. Film according to claim 5, wherein the proportion of (B) is from 5 to 40 parts per 100 parts of the combination consisting of the polymer (Z) and the HDPE.

7. Film according to any one of claim 1, comprising a tensile force of less than 5 N. the measurement being made at room temperature on a 30 μm thick (15 mm in width with an initial length $l_0$=100 mm), at a pull rate of 500 mm/min, up to elongations of 60%.

8. Glove consisting of a film according to claim 1.

* * * * *